US007812714B2

(12) United States Patent
Sakai

(10) Patent No.: US 7,812,714 B2
(45) Date of Patent: Oct. 12, 2010

(54) EMERGENCY REPORT DEVICE FOR VEHICLE

(75) Inventor: Hiroshi Sakai, Okazaki (JP)

(73) Assignee: DENSO CORPORATION, Kariya (JP)

( * ) Notice: Subject to any disclaimer, the term of this patent is extended or adjusted under 35 U.S.C. 154(b) by 347 days.

(21) Appl. No.: 11/983,607

(22) Filed: Nov. 12, 2007

(65) Prior Publication Data

US 2008/0122614 A1 May 29, 2008

(30) Foreign Application Priority Data

Nov. 24, 2006 (JP) ............................ 2006-317069

(51) Int. Cl.
*B60Q 1/00* (2006.01)

(52) U.S. Cl. .......................... 340/438; 324/433; 701/45

(58) Field of Classification Search .................. 340/438
See application file for complete search history.

(56) References Cited

U.S. PATENT DOCUMENTS 6,591,176 B1 * 7/2003 Perry et al. .................. 701/45
2005/0218902 A1 * 10/2005 Restaino et al. ............. 324/433

FOREIGN PATENT DOCUMENTS

| | | |
|---|---|---|
| JP | 11-272968 | 10/1999 |
| JP | 2000-222659 | 8/2000 |
| JP | 2000-298785 | 10/2000 |
| JP | 2003-246246 | 9/2003 |

* cited by examiner

*Primary Examiner*—Davetta W Goins
*Assistant Examiner*—Okjiako Nwugo
(74) *Attorney, Agent, or Firm*—Harness, Dickey & Pierce, PLC

(57) ABSTRACT

An emergency report device comprises: a power supply control unit that switches an electric power source from a main battery to an auxiliary battery when a supply voltage of the main battery is smaller than a predetermined threshold value; and an auxiliary battery operational check unit that performs an operational check of the auxiliary battery if the operational check of the auxiliary battery is being performed at a time when the vehicle drive mechanism starts, and if the operational check of the auxiliary battery is being performed for a first time during a period between an end of a previous day and a present time. The operational checking of the auxiliary battery is based on a current input into the auxiliary battery operational check unit from the auxiliary battery.

10 Claims, 3 Drawing Sheets

EMERGENCY REPORT DEVICE FOR VEHICLE

CROSS REFERENCE TO RELATED APPLICATION

The present application is based on and claims priority to Japanese Patent Application No. 2006-317069 filed on Nov. 24, 2006, the disclosure of which is incorporated herein by reference.

FIELD OF THE INVENTION

The present invention relates to an emergency report device for a vehicle.

BACKGROUND OF THE INVENTION

JP-A-2000-222659 shows an emergency report device for a vehicle. The emergency report device sends an emergency report signal to a service center, for example, when an airbag is inflated. In the above device, when a supply voltage of a main battery becomes lower than a predetermined threshold value, a power source is switched from a main battery to an auxiliary battery in order for an emergency report operation to be performed reliably. The power source supplies an electric power for energizing the emergency report device.

During the main battery normally supplies the electric power to the emergency report device, the auxiliary battery typically does not supply the electric power, according to the usage of the auxiliary battery. However, the auxiliary battery needs to supply the electric energy reliably when the main battery can not normally supply the electric power to the emergency report device. Therefore, it is necessary to perform a regular or periodic operational check of the auxiliary battery. The operational check of the auxiliary battery may be performed, for example, based on a current from the auxiliary battery. According to a related art, the operational check of the auxiliary battery is performed every time a vehicle drive mechanism starts or every time an IG signal is turned from an off state to an on state.

When the auxiliary battery as a primary battery is not rechargeable, the auxiliary battery needs to have a large current capacity so as to ensure the electronic power for starting the vehicle drive mechanism many times. However, in the above-described case, a manufacturing cost may increase. Further, a vehicle weight would increase, and the increase in the vehicle weight would cause a negative influence on fuel-efficiency.

It would be required for an emergency report device to perform an operational check of an auxiliary battery appropriately. It would be also desirable for an emergency report device that can be energized by an electric power from an auxiliary battery having a small current capacity.

SUMMARY OF THE INVENTION

In view of the above-described problem, it is an object of the present disclosure to provide an emergency report device for a vehicle.

According to a first aspect of the present disclosure, an emergency report device for a vehicle having a vehicle drive mechanism, the emergency report device performing an emergency report operation by an electric power supplied from an electric power source including an auxiliary battery as a primary battery and a main battery, the emergency report device comprises: a power supply control unit that switches the electric power source from the main battery to the auxiliary battery when a supply voltage of the main battery is smaller than a predetermined threshold value; and an auxiliary battery operational check unit that performs an operational check of the auxiliary battery if both of the following conditions are satisfied: the operational check of the auxiliary battery is being performed at a time when the vehicle drive mechanism starts; and the operational check of the auxiliary battery is being performed for a first time during a period between an end of a previous day and a present time. The performing of the operational check of the auxiliary battery is based on a current input into the auxiliary battery operational check unit from the auxiliary battery.

According to the above emergency report device, the number of the performing of the operational check of the auxiliary battery may be reduced. Increase in manufacturing cost may be prevented. A negative influence on fuel-efficiency may be prevented.

According to a second aspect of the present disclosure, an emergency report device for a vehicle having a vehicle drive mechanism, the emergency report device performing an emergency report by an electric power supplied from an electric power source including an auxiliary battery as a primary battery and a main battery, the emergency report device comprises: a power supply control unit that switches the electric power source from the main battery to the auxiliary battery when a supply voltage of the main battery is smaller than a predetermined threshold value; and an auxiliary battery operational check unit that performs an operational check of the auxiliary battery if both of the following conditions are satisfied: the operational check of the auxiliary battery is being performed at a time when the vehicle drive mechanism starts; and a time interval between the operational check of the auxiliary battery to be performed and a previous operational check of the auxiliary battery is equal to or larger than a predetermined value. The performing of the operational check is based on a current input into the auxiliary battery operational check unit from the auxiliary battery.

According to the above emergency report device, the number of the performing of the operational check of the auxiliary battery may be reduced. Increase of manufacturing cost may be prevented. A negative influence on fuel-efficiency may be prevented.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Example Embodiment

Figure 1:
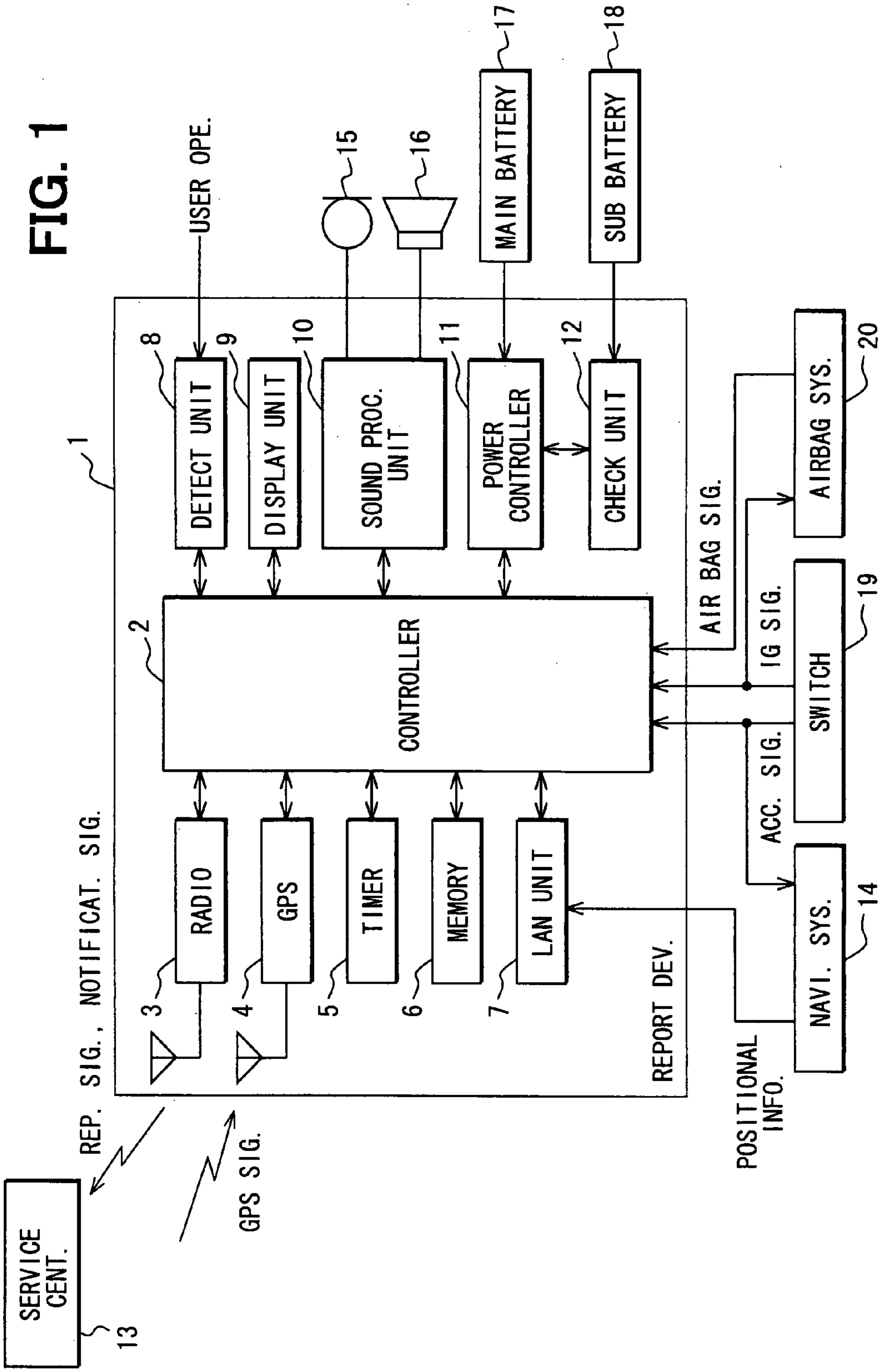
FIG. 1 is a block diagram illustrating an emergency report device according to an example embodiment of the present invention.

An emergency report device 1 for a vehicle, for example as shown FIG. 1, includes a control unit 2, an operational check result sending unit 3 such as a radio communication unit 3, a Global Positioning System (GPS) unit 4, a timer unit 5, a memory unit 6, a Local Area Network (LAN) transmission reception unit 7, an operation detection unit 8, an operational check notification unit 9 such as a display unit 9, a sound processing unit 10, a power supply control unit 11, and an auxiliary battery operational check unit 12.

The control unit 2 includes a Central Processing Unit (CPU). The control unit 2 may control almost whole operations associated with the emergency report device 1. When an emergency report signal is input into the radio communication unit 3 from the control unit 2, the radio communication unit 3 can communicate with a service center 13 via an audio line, and can output the emergency report signal to the service center 13 via a radio communications network. In the above-described case, the radio communication unit 3 switches between an audio communication operation and a data communication operation with maintaining the audio line being in communication, and enables to perform the audio communication operation and the data communication operation between a relevant vehicle driver and the service center 13. The emergency report signal to be sent to the service center 13 includes various information such as positional information and device-identification information. The device-identification information is used for identifying the emergency report device 1.

When the GPS unit 4 receives a GPS signal from a GPS satellite, the GPS unit 4 can extract a parameter from the GPS signal, can execute a calculation such as a positioning calculation, can obtain positional information, and can output the positional information. The timer unit 5 has a clock function. When a read time-date signal is input into the timer unit 5 from the control unit 2, a time-date at the time when the time-date signal is input is outputs to the control unit 2 by the timer unit 5. The memory unit 6 can store various information items. The LAN transmission reception unit 7 can receive and obtain positional information from a navigation system 14. The operation detection unit 8 outputs an operation detection signal to the control unit 2 when the operation detection unit 8 detects that an emergency report button is pressed or activated. When a display command signal is input to the display unit 9 from the control unit 2, the display unit 9 can display an information item such as a message associated with an instruction of the display command signal.

The sound processing unit 10 can process sound. The sound is, for example, a voice input into a microphone 15 and a voice to be output from speaker. In the above-described case, a user can have conversation with an operator in the service center 13, and the user can request a help to the operator or can report an extent of an accident to the operator.

The power supply unit 11 controls an electric power to be supplied to each functional block or unit. The electric power, which works as an operational power, is supplied either from a main battery 17 or from the auxiliary battery 18. The auxiliary battery 18 may include a primary battery. More specifically, the power supply control unit 11 can operate as follows. The power supply control unit 11 detects a voltage across the main battery 17 and a voltage across the auxiliary battery 18. When a supply voltage of the main battery 17 exceeds a predetermined threshold value, the power supply control unit 11 allows the main battery 17 to supply the electronic power to each functional block or unit. The predetermined threshold value is, for example, 8V. When the supply voltage of the main battery 17 does not exceed the predetermined threshold value, the power supply control unit 11 switches a electric power source unit from the main battery 17 to the auxiliary battery 18, and the power supply control unit 11 allows the auxiliary battery 18 to supply the electronic power to each functional block or unit via the auxiliary battery operational check unit 12.

When an operational check signal is input into the auxiliary battery operational check unit 12 from the control unit 2 via the power supply control unit 11, a current from the auxiliary battery 18 is input or retrieved in the auxiliary battery operational check unit 12. The supply voltage of the auxiliary battery 18 at a time when the current is input is detected by the auxiliary battery operational check unit 12. Then, the auxiliary battery operational check unit 12 performs an operational check of the auxiliary battery 18. When the supply voltage at the time during the current is input exceeds a predetermined value, the auxiliary battery operational check unit 12 determines that the auxiliary battery 18 operates normally. When the supply voltage at the time during the current is input does not exceed a predetermined value, the auxiliary battery operational check unit 12 determines that the auxiliary battery 18 operates abnormally. The detected result of the operational check is output to the control unit 2.

A power source switch 19 includes an ignition (IG) switch and accessory (ACC) switch. The power source switch 19 outputs an IG signal to the control unit 2 and an airbag system 20. The IG signal includes information on whether the IG switch is turned on or off. The power source switch 19 also outputs an ACC signal to the control unit 2 and a navigation system 14. The ACC signal includes information on whether the ACC switch is turned on or off. In the above-described case, the control unit 2 can be activated or halted in accordance with the information of the ACC signal. The navigation system 14 can be also activated and halted in accordance with the information of the ACC signal. The airbag system outputs an airbag inflation signal to the control unit 2 when an airbag is inflated, and when the IG signal indicates that the IG switch is turned on.

The emergency report device 1 includes the above-described units, elements and the like. Alternatively, the emergency report device 1 may be a module having the above-describe configurations or functions. In the present embodiment, an emergency report operation starts with a trigger. The trigger is that when an emergency report button is activated or pressed by a user, the control unit 2 receives the operation detection signal from the operation detection unit 8. Alternatively, the trigger may be that the control unit 2 receives the airbag inflation signal from the airbag system 20. After the trigger boots the emergency report operation, the radio communication unit 3 sends the emergency report signal to the service center 13 via the radio communications network. The emergency report signal includes the positional information obtained by the GPS unit 4 and the positional information received by the LAN transmission reception unit 7 from the navigation system 14.

Figure 2:
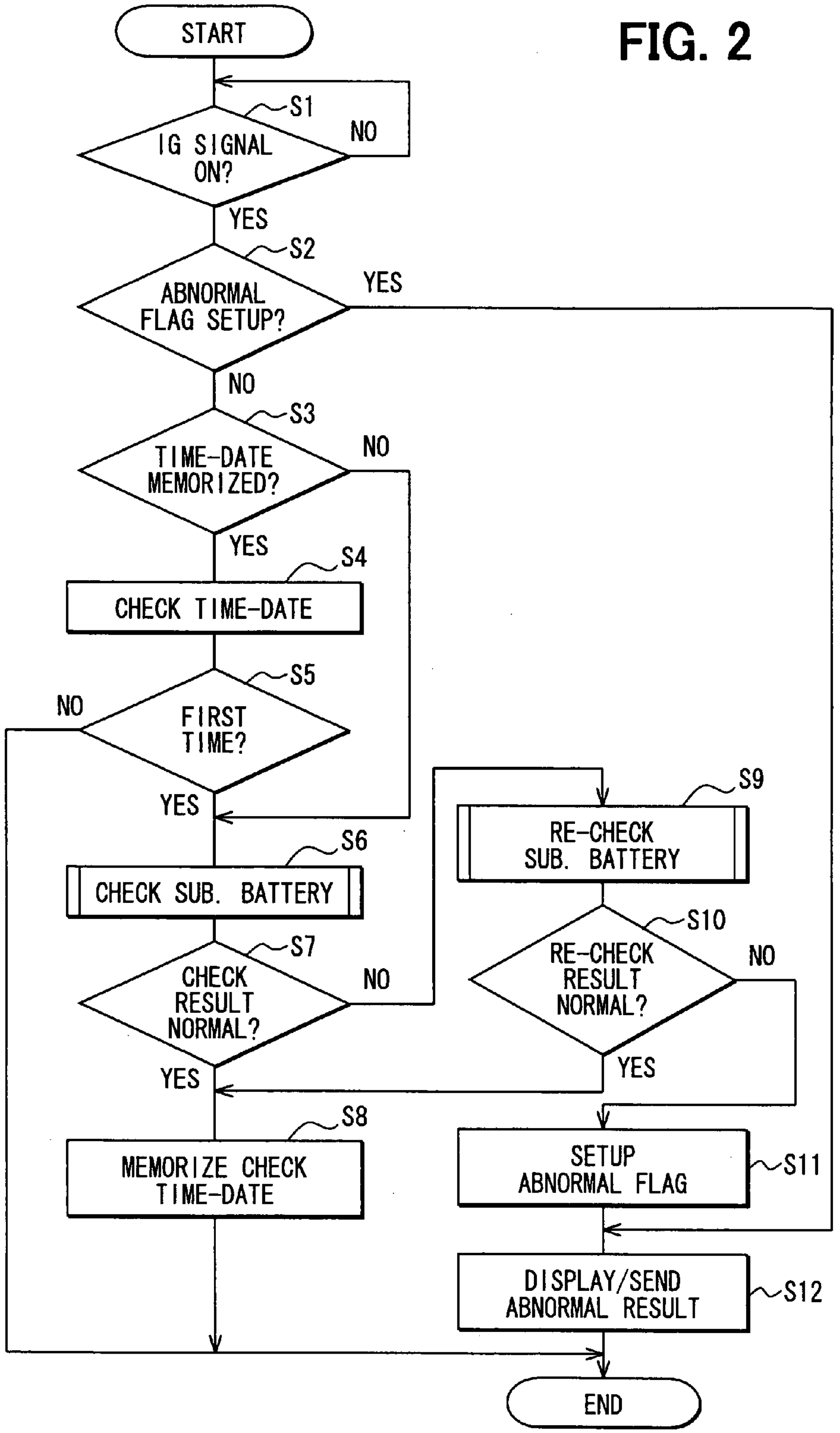
FIG. 2 is a flow chart illustrating a operation according to the example embodiment.
Figure 3A:
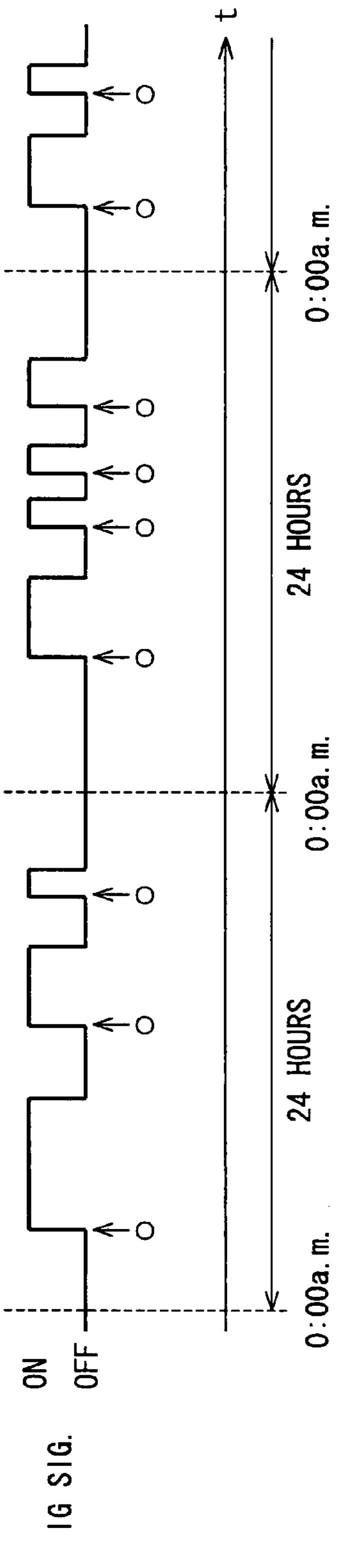
FIG. 3A RELATED ART
FIG. 3A is a timing chart illustrating an operational check of an auxiliary battery according to a related art.
Figure 3B:
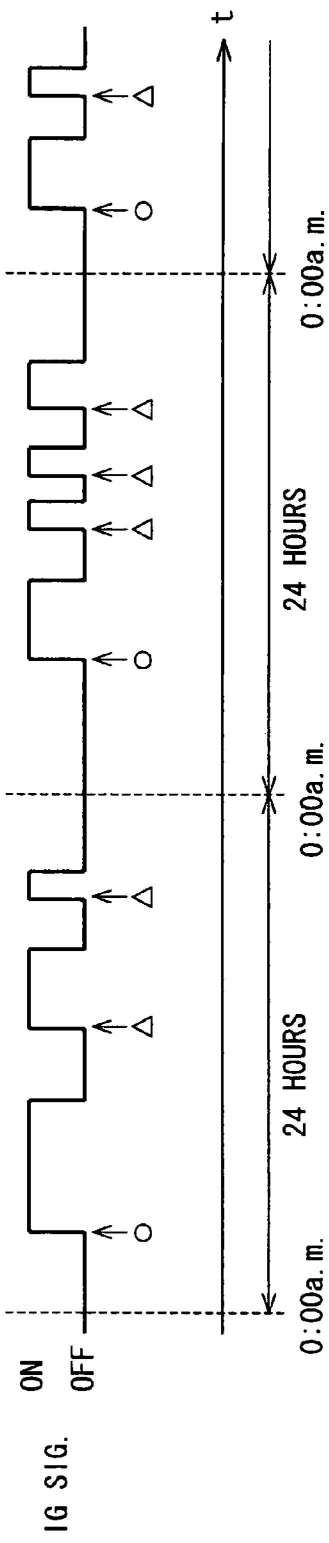
FIG. 3B is a timing chart illustrating an operational check of an auxiliary battery according to the example embodiment of the present invention.

The emergency report device 1 according to the present embodiment may perform operations explained below, which are described below with reference to FIGS. 2, 3A and 3B. In FIGS. 3A and 3B, each open circle denotes a time at which the operational check of the auxiliary battery 18 is performed, and each open triangle denotes a timing at which the operational check of the auxiliary battery 18 is not performed.

In S1, the control unit 2 determines whether the IG signal is switched from an OFF state to an ON state, where the IG signal is from the power source switch 19. In other words, in S1, the control unit 2 determines whether a vehicle drive mechanism starts or not. A branch "YES" at S1 corresponds to a determination that the IG signal is switched from the OFF state to ON the state.

At a time when the branch "YES" at S1 is selected, the control unit 2 determines whether an auxiliary battery abnormal flag is set or not in S2. A branch "NO" at S2 corresponds to a determination that the auxiliary battery abnormal flag is not set. If the branch "NO" at S2 is selected, the control unit 2 determines whether an information item associated with an operational check time-date is stored or not in S3. A branch "NO" at S3 corresponds to a determination that the information item associated with the operational check time-date is not stored. If the branch "NO" at S3 is selected, the control unit 2 performs following operation in S6. The control unit 2 outputs an operational check command signal to the auxiliary battery operational check unit 12 via the power supply control unit 11, and the control unit 2 allows the auxiliary battery operational check unit 12 to perform an operational check of the auxiliary battery 12.

A branch "YES" at S3 corresponds to a determination that the information item associated with the operational check time-date is stored. If the branch "YES" at S3 is selected, the control unit 2 references the stored information item associated with the operational check time-date in S4. In S5, the control unit 2 cross-checks the stored information item associated with the operational check time-date and the time-date input from timer unit 5. Further, in S5, the control unit 2 determines whether the IG signal is switched to the ON state for a first time during a period between an end of a previous day and a present time. A branch "YES" at S5 corresponds to a determination that the IG signal is switched to the ON state for a first time during the period between the end of the previous day and the present time. If the branch "YES" at S5 is selected, the control unit 2 outputs the operational check command signal to the auxiliary battery operational check unit 12 via the power supply control unit 11 in S6. Further, in S6, the control unit 2 allows the auxiliary battery operational check unit 12 to perform the operational check of the auxiliary battery 18.

In S7, the control unit 2 determines, based on the result of the operational check of the auxiliary battery 18, whether the auxiliary battery 18 operates normally or abnormally. A branch "YES" at S7 corresponds to a determination that the auxiliary battery 18 operates normally. If the branch "YES" at S7 is selected, the control unit 2 performs following operations in S8. The information item associated with a time-date when the operational check has performed is stored or updated as the operational check time-date, and then a series of operations finishes.

A branch "NO" at S7 corresponds to a determination that the auxiliary battery 18 operates abnormally. If the branch "NO" at S7 is selected, the control unit 2 performs the following operations in S9. The control unit 2 again outputs the operational check command signal to the auxiliary battery operational check unit 12 via the power supply control unit 11. The control unit 2 allows the auxiliary battery operational check unit 12 to perform again the operational check of the auxiliary battery 12. Then, in S10, the control unit 2 determines again whether the auxiliary battery 18 operates normally or abnormally. A branch "YES" at S10 corresponds to a determination that the auxiliary battery 18 operates normally. If the branch "YES" at S10 is selected, the control unit 2 performs the S8 operation.

A branch "NO" at S10 corresponds to a determination that the auxiliary battery 18 operates normally. If the branch "NO" at S10 is selected, the control unit 2 set the auxiliary battery abnormal flag in S11. Then, in S12, the control unit 2 allows, for example, the display unit 9 to display a message indicating that the auxiliary battery 18 works abnormally. Alternatively, the control unit 2 may allow a light-emitting diode (now shown in FIGS.) to blink on and off for indicating that the auxiliary battery 18 works abnormally. Alternatively, the control unit 2 may allow the radio communication unit 3 to send an auxiliary battery abnormal behavior signal to the service center 13. The auxiliary battery abnormal signal includes information indicating that the auxiliary battery 18 works abnormally.

A branch "YES" at S2 corresponds to a determination that the auxiliary battery abnormal flag is set. When the control unit 2 determined that the auxiliary battery abnormal flag is set just after determining that the IG signal is switched from the OFF state to the ON state, the control unit 2 also allows, for example, the display unit 9 to display a message indicating that the auxiliary battery 18 works abnormally. Alternatively, the control unit 2 may allow the light-emitting diode to blink on and off for indicating that the auxiliary battery 18 works abnormally. Alternatively, the control unit 2 may allow the radio communication unit 3 to send the auxiliary battery abnormal behavior signal to the service center 13.

As described-above, and as described in FIG. 3 for example, the control unit 2 allows the unit 12 to perform the operational check of the auxiliary battery 18, not every time the IG signal is switched from the OFF state to the ON state but only a first time during a day the IG signal is switched from the OFF state to the ON state. After the first-time operational check in the day is performed, the control unit 2 does not perform the operational check of the auxiliary battery 18 during the day even if the IG signal is switched from the OFF state to the ON state.

According to the above-description, the control unit 2 cross-checks the stored information item associated with the operational check time-date and the time-date input from timer unit 5, and the control unit 2 determines whether the control unit allows the auxiliary battery operational check unit 12 to perform the operational check of the auxiliary batter 18. Alternatively, the auxiliary battery operational check unit 12 may cross-check the stored information item associated with the operational check time-date and the time-date input from timer unit 5, and the auxiliary battery operational check unit 12 may determine whether the operational check of the auxiliary batter 18 is to be performed or not. According to the above-description, at a time when the vehicle drive mechanism starts, the auxiliary battery operational check unit 12 performs the operational check of the auxiliary battery 18 if the operational check of the auxiliary battery (18) is being performed for a first time during a period between an end of a previous day and a present time. Alternatively, at the time when the vehicle drive mechanism starts, the unit 12 may perform the operational check if a time interval between the operational check of the auxiliary battery (18) to be performed and a previous operational check of the auxiliary battery (18) is equal to or larger than a predetermined value.

In the present embodiment, as described above, the operational check of the auxiliary battery 18 is performed at one of timings, where, at each of the timings, the IG signal is switched from the OFF state to the ON state. In an apparatus according to a related art, the operational check of the auxiliary battery 18 is performed every time the IG signal is switched from the OFF state to the ON state. Thus, in the present embodiment, it is possible to reduce the number of the performing of the operational check compared to the apparatus according to the related art. Further, in the present embodiment, it is possible to adjust the number of the performing of the operational check appropriately. Therefore, the emergency report device 1 according to the present embodiment does not require an auxiliary battery having a large current capacity. The increase of a manufacturing cost and the lowering of fuel-efficiency are prevented.

In the present embodiment, since a condition for performing the operational check of the auxiliary battery 18 includes a case in which no operational check is performed during a day, the operational check of the auxiliary battery 18 can be performed if the operational check to be performed is the first time operational check during the day. In the above-described case, the operational check may be performed at a time when the IG signal is switched from the OFF state to the ON state. When the vehicle is used during day time, and when the vehicle is not used during night time, the operational check of the auxiliary battery 18 is performed in a low temperature condition. The operational check is performed with high accuracy if the number of the performing of the operational check is small.

The display unit 9 may display a message indicating that the auxiliary battery 18 works abnormally. The radio communication unit 3 may sends the auxiliary battery abnormal behavior signal to the service center 13. Therefore, it is possible for the relevant driver and the operator in the service center 13 to receive a notice indicating that the auxiliary battery 18 works abnormally. The relevant driver may be in a relevant vehicle.

The trigger for starting the emergency report operation includes a signal from the airbag system. Alternatively, another system or other systems may cause the emergency report operation to start. The emergency report device 1 according to the present embodiment can send the auxiliary battery abnormal behavior signal, which indicates that the auxiliary battery 18 works abnormally, to the relevant driver and the operator in the service center 13. Alternatively, the emergency report device 1 according to the present embodiment may send an auxiliary battery normal behavior signal, which indicates that the auxiliary battery 18 works normally, to the relevant driver and the operator in the service center 13. Alternatively, by means of outputting an audio, a notice that the auxiliary battery 18 works normally or a notice that the auxiliary battery 18 works abnormally is notified to the relevant driver or the operator in the service center 13.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An emergency report device for a vehicle having a vehicle drive mechanism, the emergency report device performing an emergency report operation by electric power supplied from an electric power source including an auxiliary battery and a main battery, the emergency report device comprising:

a power supply control unit that switches the electric power source from the main battery to the auxiliary battery when a supply voltage of the main battery is smaller than a predetermined threshold value; and an auxiliary battery operational check unit that performs an operational check of the auxiliary battery; wherein the operational check of the auxiliary battery is performed at a time when the vehicle drive mechanism starts;

the operational check of the auxiliary battery is performed a first time when the vehicle drive mechanism starts a first time after an end of a previous day;

the operational check of the auxiliary battery is prohibited from being performed during the same day after the operational check of the auxiliary battery is performed the first time; and the performing of the operational check of the auxiliary battery is based on a current input into the auxiliary battery operational check unit from the auxiliary battery.

2. The emergency report device according to claim 1, further comprising:

an operational check notification unit that notifies a result of the operational check of the auxiliary battery, the operational check performed by the auxiliary battery operational check unit.

3. The emergency report device according to claim 1, further comprising:

an operational check result sending unit that sends a result of the operational check of the auxiliary battery to an external system, the operational check performed by the auxiliary battery operational check unit.

4. The emergency report device according to claim 2, wherein the operational check notification unit includes a display unit for displaying an information item associated with the result of the operational check of the auxiliary battery.

5. The emergency report device according to claim 3, wherein the operational check result sending unit includes a radio communication unit for sending the result of the operational check of the auxiliary battery to the external system via a radio communications network.

6. An emergency report device for a vehicle having a vehicle drive mechanism, the emergency report device performing an emergency report by electric power supplied from an electric power source including an auxiliary battery and a main battery, the emergency report device comprising:

a power supply control unit that switches the electric power source from the main battery to the auxiliary battery when a supply voltage of the main battery is smaller than a predetermined threshold value; and an auxiliary battery operational check unit that performs an operational check of the auxiliary battery; wherein the operational check of the auxiliary battery is being performed at a time when the vehicle drive mechanism starts;

the operational check of the auxiliary battery is performed if a previous operational check of the auxiliary battery was not performed during a specified time interval;

the operational check of the auxiliary battery is prohibited from being performed if the previous operational check of the auxiliary battery was performed during the specified time interval; and the performing of the operational check is based on a current input into the auxiliary battery operational check unit from the auxiliary battery.

7. The emergency report device according to claim 6, further comprising:

an operational check notification unit that notifies a result of the operational check of the auxiliary battery, wherein the operational check is performed by the auxiliary battery operational check unit.

8. The emergency report device according to claim 6, further comprising:

an operational check result sending unit that sends a result of the operational check of the auxiliary battery to an external, wherein the operational check is performed by the auxiliary battery operational check unit.

9. The emergency report device according to claim 7, wherein the operational check result notification unit includes a display unit for displaying an information item associated with the result of the operational check of the auxiliary battery.

10. The emergency report device according to claim 8, wherein the operational check result sending unit includes a radio communication unit for sending the result of the operational check of the auxiliary battery to the external system via a radio communications network.

* * * * *